Oct. 4, 1966          C. C. WILLIAMSON          3,276,307
CONVEYING APPARATUS FOR METAL SHEARS
Filed Nov. 17, 1965                    3 Sheets-Sheet 1
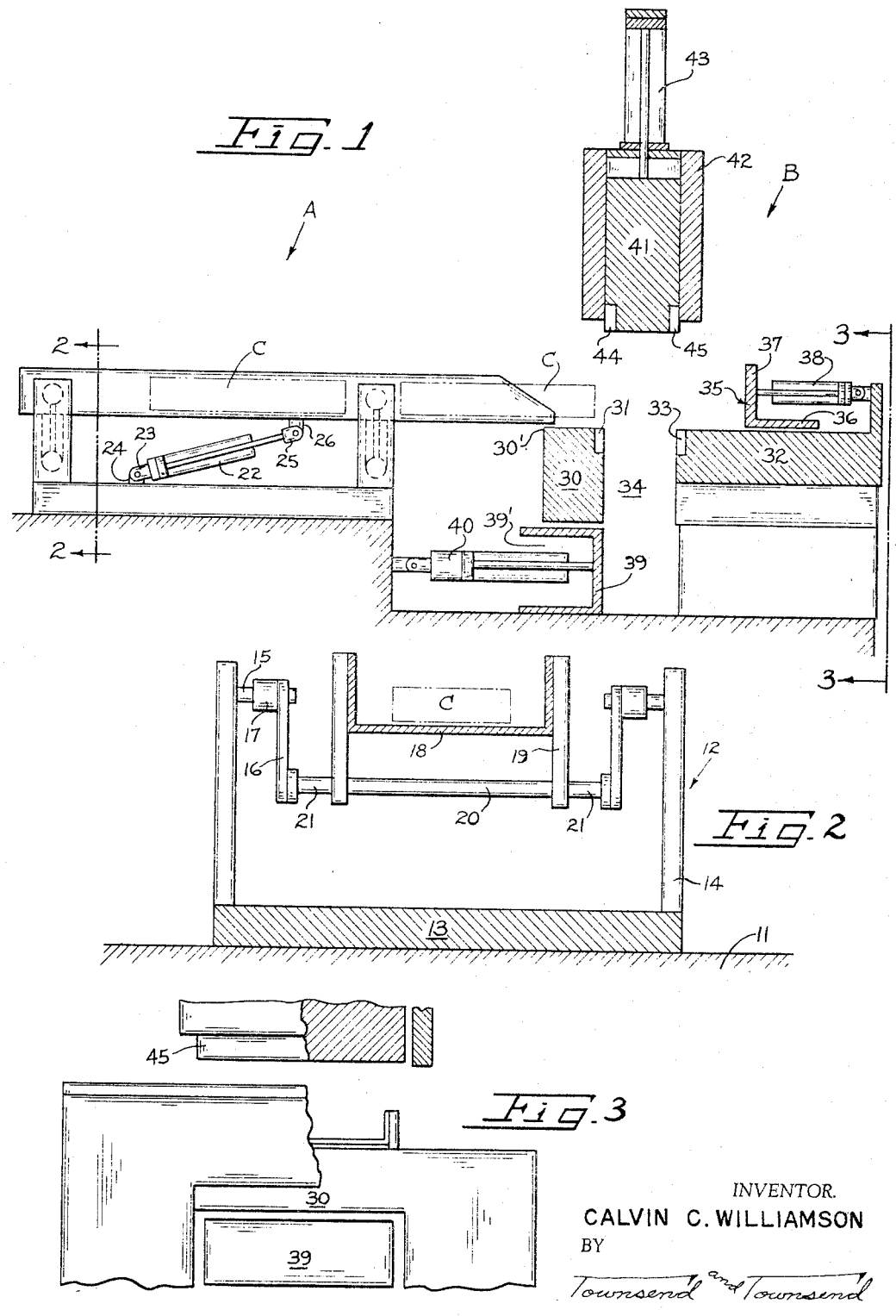
INVENTOR.
CALVIN C. WILLIAMSON
BY
Townsend and Townsend
ATTORNEYS

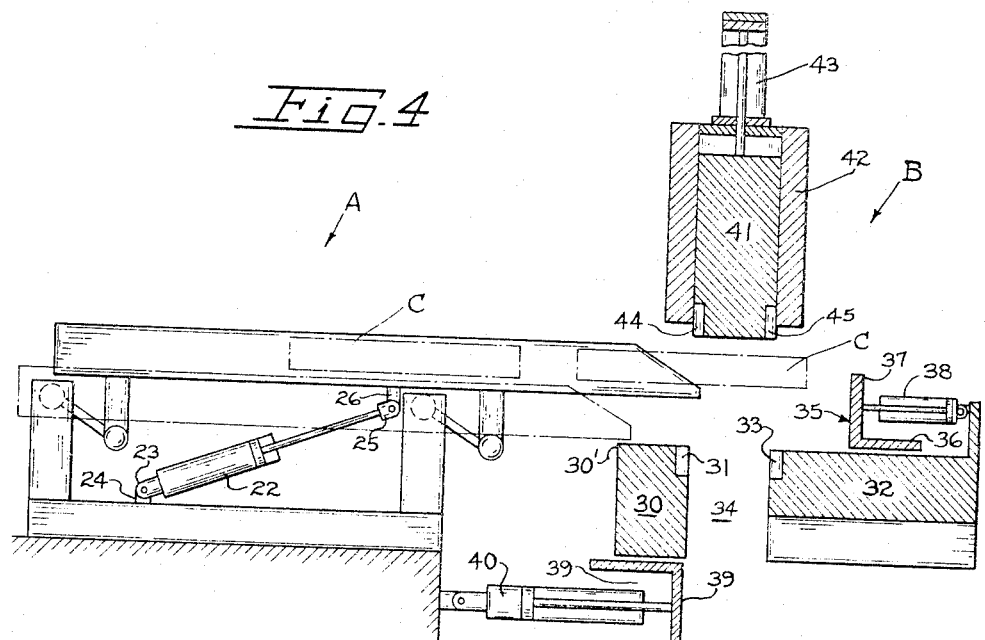
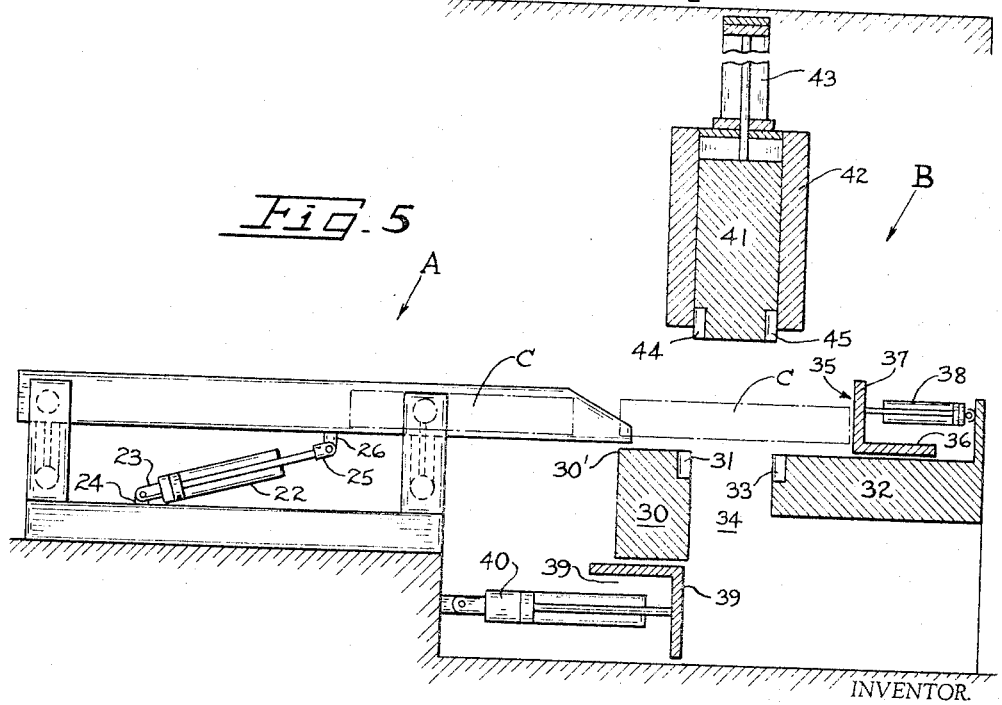

INVENTOR.
CALVIN C. WILLIAMSON
BY
Townsend and Townsend
ATTORNEYS

UNITED STATES PATENT OFFICE

3,276,307
CONVEYING APPARATUS FOR METAL SHEARS
Calvin C. Williamson, San Francisco, Calif., assignor to Soule Steel Company, San Francisco, Calif.
Substituted for abandoned application Ser. No. 252,677, Jan. 21, 1963. This application Nov. 17, 1965, Ser. No. 513,640
5 Claims. (Cl. 83—419)

The present invention relates in general to a conveying method and apparatus and more particularly to method and apparatus for transporting large, heavy objects to a processing stage at the end of the conveying apparatus.

It is often necessary to transport large heavy objects for which conventional conveying methods and structures do not operate satisfactorily. The present invention is specifically applicable to a portion of a complete scrap steel reclaiming operation in which the bodies of junked automobiles are crushed relatively flat and then sheared into scrap pieces which are typically eight feet long, have a cross section one foot square and weigh on the average twenty pounds. These scrap pieces must be conveyed to a station at which they are further reduced in size before being placed in furnaces wherein substantially all non-steel material is consumed.

The principal object of the present invention is to provide a method and apparatus for conveying large, heavy objects such as those described above. According to the present invention, large scrap pieces or like objects are transported by a swinging conveyor which is rotatably supported at at least two positions by extension arms so that, upon swinging the conveyor forward and rapidly returning the conveyor to rest, the pieces are thrown forward.

One feature and advantage of this invention lies in the fact that the objects being transported are carried a considerable distance through the air after leaving the end of the conveyor and can be deposited on a platform at a position spaced from the end of the conveyor. This structure and method avoids the possibility of the pieces jamming in the apparatus immediately at the end of the conveyor.

Another feature and advantage of this invention lies in the fact that such movement of objects can be accomplished without continuous movement of the objects so that other operations such as shearing can take place between the time at which successive objects are thrown forward from the end of the conveyor.

Still another feature and advantage of this method and apparatus lies in the fact that upon forward and upward movement of the conveyor to swing the pieces forward, rearward movement of the pieces on the conveyor is prevented by the increased friction between the pieces and the conveyor.

Still another feature and advantage of this method and apparatus lies in the fact that the effective forward motion of the objects takes place when the objects are in the air above the conveyor and at that time the weight of the objects does not create a frictional force tending to inhibit forward motion of the objects as exists in a continuously moving belt conveyor.

Another object of this invention is to provide method and apparatus wherein the pieces transported forward from the end of the conveyor, fall onto a shearing aperture spaced from the end of the conveyor.

Still another feature and advantage of such a conveying and shearing method and apparatus lies in the fact that a shearing stroke may be made vertically downward upon the pieces at the end of the conveyor and the weight of the shear bar is utilized as part of the force necessary to create the shearing operation.

Still another object of the invention is to provide a method and apparatus wherein the material pieces conveyed onto the shearing aperture extend therebeyond and are stopped therebeyond a distance substantially equal to the width of the shearing aperture.

Still another feature and advantage of the present invention lies in the fact that by throwing the material from the end of the conveyor onto a shearing opening several pieces of reduced size can be produced in one shearing operation. Besides those portions of the object being sheared which are positioned over the shearing opening and beyond the end of the shearing opening, the remainder of the object may also be of the desired reduced size.

Other objects of the present invention will become apparent upon reading the following specification and referring to the accompanying drawing in which similar characters of reference represent corresponding parts in each of the several views.

In the drawing:

FIG. 1 is a schematic, longitudinal view, partially in section, illustrating the structure utilized in accomplishing the present invention;

FIG. 2 is a cros-sectional view of the structure of FIG. 1 taken along line 2—2;

FIG. 3 is an end view partially broken away of the structure shown in FIG. 1 taken along line 3—3; and FIGS. 4–7 are views similar to FIG. 1, showing the operation of the structure according to the present invention and the sequential steps in accomplishing the method according to the present invention.

Figure 6:
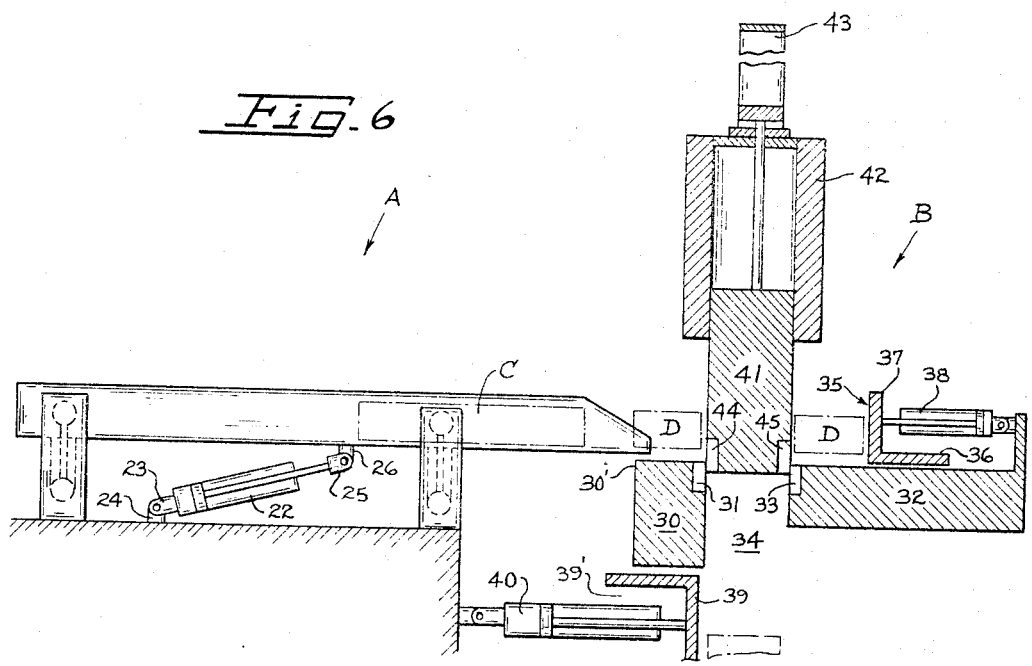

While the present invention will be described below as specifically applicable to the movements of automobile body scrap pieces to a shearing stage for shearing the pieces into smaller pieces for their processing, it will be obvious that the structure and method described can be used in many other ways and for many other materials.

Referring now to the drawing, with particular reference to FIGS. 1–3, a conveyor assembly A is provided for moving large, heavy objects C such as, for example, scrap steel pieces, to a shear assembly B. The conveyor assembly A includes a conveyor frame 12 supported on an elevated portion of a main mounting frame 11 which supports the conveyor and shear assemblies A and B. The conveyor frame 12 includes a flat, elongate base 13 which is provided at each of its corners, with a vertically upward directed support member 14. At each end of the base 13 the two vertical support members 14 are provided at the top thereof with axially aligned horizontal pins 15 projecting inwardly therefrom. A swinging support arm 16 is rotatably supported on each of the pins 15 by means of a bearing assembly 17.

Positioned between those vertical support members 14 on opposite sides of the base 13 is a conveyor bed 18 which is generally U-shaped in transverse cross-section and adapted to carry the scrap pieces C being transported. The conveyor bed 18 is provided with vertically, downwardly extending conveyor bed arms 19, each of which is positioned adjacent to and aligned with one of the vertical support members 14 when the conveyor is at rest. Secured to the lower end of each pair of arms 19 on opposite sides of the conveyor bed 18 is a horizontal support shaft 20 which is trunnion mounted by means of bearings 21 in the lower end of a pair of the swinging arms 16 positioned on opposite sides of the base 13.

An air cylinder 22 for applying motion to the conveyor bed 18 has a clevis 23 at its one end pivotally connected to a tongue 24 mounted on the top of the conveyor frame base 13 and the end of the cylinder piston rod is provided with a clevis 25 pivotally connected to a tongue 26 mounted on the bottom of the conveyor bed 18. Forward actuation of the air cylinder 22 causes the conveyor bed 18 to swing forward on the swinging arms 16, and if the cylinder piston rod is retracted rapidly enough, the auto body scrap C is caused to be thrown in the forward direction along the conveyor bed 18 as described in greater detail below.

The shear assembly B includes a horizontal girder 30 aligned transverse to the longitudinal axis of the conveyor bed 18 and positioned with the top longitudinal edge 30' thereof, that is closest the conveyor assembly, adjacent the very end of the conveyor bed 18 when the conveyor assembly is at rest. Along the opposite top longitudinal edge is positioned a stationary shear blade 31. Spaced from the girder 30 on the side thereof away from the conveyor assembly A is another horizontal girder 32 also arranged transverse to the longitudinal axis of the conveyor bed 18. The top surfaces of the girders 30 and 32 lie in the same horizontal plane to serve as a working surface for the shear assembly B, and the top edge of the girder 32 closest girder 30 is provided with a stationary shear blade 33, the space between the stationary shear blades 31 and 33 on the girders 30 and 32, respectively, defining a shear opening 34. Positioned on the top of the girder 32 is an angle back stop 35 having a flat, horizontal portion 36. The horizontal portion 36 is slidable along the top surface of the girder 32 by means of a hydraulic cylinder 38 to move a vertical portion 37 of the back stop 35 from an extended position in vertical alignment with shear blade 33 to a retracted position horizontally spaced from the shear blade 33 a distance substantially equal to the width of the shear opening 34.

Positioned in the horizontal opening 39' below the girder 30 and above the main mounting frame 11 is a movable sweep 39, U-shaped in cross-section, and turned on its side to entirely fill the opening 39'. A hydraulic cylinder 40 is provided for moving the sweep 39 from a retracted position with the front of the sweep vertically aligned with the edge of blade 31 forward toward the girder 32 to an extended position to clear the area below the shear opening 34 as described in greater detail below.

Positioned above the shear opening 34 is an elongate shear bar 41, the long sides of which are vertically aligned with the edges of the opening 34. The longitudinal edges of the shear bar 41 are provided with shear blades 44 and 45, the outer edges of which are respectively vertically aligned with the outer edges of shear blades 31 and 33. The shear bar 41 is movably positioned in a housing 42 for vertical movement by a hydraulic cylinder 43 which moves the shear bar 41 from a retracted position spaced upwardly from the shear opening 34 to an extended position in which the shear bar shear blades 44 and 45 are positioned adjacent the stationary shear blades 31 and 33 respectively.

Figure 7:
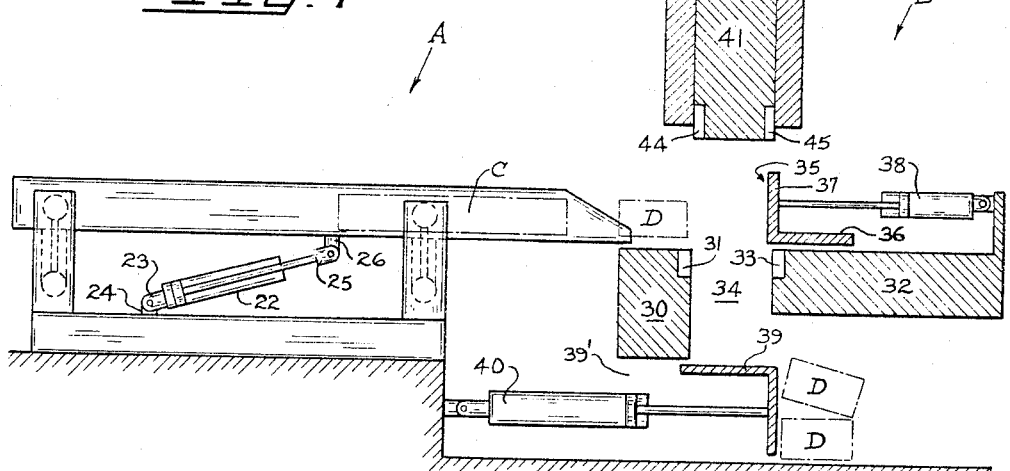

Referring now to FIGS. 1 and 4-7, there is illustrated the operation of the present invention. In FIG. 1 the conveyor is shown at rest and the shear bar 41, the back stop 35 and the sweep 39 are all in retracted position. Upon actuation of the air cylinder 22, the conveyor is swung forward and upward (see FIG. 4) and immediately retracted to throw the auto body scrap C forward along the conveyor bed 18. The forwardmost auto body scrap member C is thrown forward off the end of the conveyor and is stopped by the back stop 35 over the shear opening 34 (see FIG. 5). Then upon actuation of hydraulic cylinder 43, the shear bar 41 is driven down to shear the auto scrap along lines defining the edges of the shear opening 34, and the sheared portion drops through the shear opening (see FIG. 6). Upon retraction of the shear bar 41, the back stop 35 is moved forward by cylinder 38 to clear any scrap pieces remaining on top of the girder 32, and then the sweep 39 is moved forward by cylinder 40 to sweep the auto body scrap pieces from beneath the shear opening 34 toward a conveyor, not shown (see FIG. 7). This latter conveyor carries the scrap pieces to a furnace in which all the non-steel material is consumed.

Certain changes could be made in the structure disclosed without parting from the scope of the invention. For example, the conveyor could be swung from a mounting structure positioned above the conveyor but the arrangement described in detail above is preferable since the area above the conveyor bed is free of obstructions which the thrown pieces might strike.

Also, while the pairs of swinging arms 16 are preferably of equal length and hang vertically downward from the pins 15 when the conveyor bed 18 is at rest, the pairs of arms 16 may be of different lengths and may be angled slightly toward or away from one another when the conveyor is at rest. The conveyor has been described as supported on two pairs of swinging arms 16, but, obviously, a long conveyor can be supported by any number of support arms.

Furthermore, the conveyor bed 18 can be supported by swinging arms on just one side thereof if the lower end of these swinging arms is provided with a horizontal extension which is journaled on the underside of the conveyor bed. Similarly, instead of the swinging arms being arranged in pairs along the length of the conveyor bed 20, they can be staggered on opposite sides of the conveyor bed as long as they are each rotatable with respect to the conveyor bed so that the conveyor bed is permitted to swing properly. Also each swinging arm can consist of a chain in which case bearings are not necessary at the ends thereof, but the driving force applied by the air cylinder 22 must be so arranged that the conveyor bed 18 properly swings forward when the scrap bundles C are on the bed 18 and properly swings backward when the bundles are being thrown through the air.

Also, while it is far more advantageous to have the swinging arms pivoted at their upper end on the main frame and hanging downward, it is possible to convey objects down the length of the conveyor when the conveyor is swingably supported by arms which are rotatably mounted at their lower end and are held upwardly to swing the conveyor.

All these and other details have been shown by way of illustration and example for the purpose of clarity of understanding, and it is understood that certain changes and modifications can be made within the spirit of the invention as limited by the scope of the appended claims.

What is claimed is:
1. Apparatus for conveying large, heavy objects comprising: a main frame; an elongate conveyor bed constructed and arranged to support said objects thereon between the sides thereof; means for swingably supporting said conveyor bed in depending relation of said frame to swing said conveyor bed so that said sides of said conveyor bed move in substantially vertical planes; driving means mounted on said frame for imparting a driving force to said conveyor bed to swing said conveyor bed forward; and means for rapidly returning said conveyor bed backward to rest position whereby, upon applying intermittent driving forces to said conveyor bed with said driving means and returning said conveyor bed to rest, said objects are intermittently thrown forwardly down said conveyor bed to convey the objects the length of said conveyor apparatus.

2. Apparatus in accordance with claim 1 wherein said means for swingably supporting said conveyor bed from said frame include a plurality of support arms, means for rotatably connecting one end of said support arms to said conveyor bed, and means for swingably supporting the other end of said support arms from said frame; driving means mounted on said frame for imparting a driving force to said conveyor bed to swing said conveyor bed forward on said support arms; and means for rapidly returning said conveyor bed backward to rest position whereby upon intermittently actuating said driving means and said returning means said objects on said conveyor bed are intermittently thrown forwardly down said conveyor bed to convey the objects the length of the conveying apparatus.

3. Apparatus in accordance with claim 2 wherein said plurality of support arms are positioned substantially vertically when said conveyor bed is at rest, and including means for rotatably connecting one end of each of said support arms to said conveyor bed and means for rotatably supporting the other end of said support arms from said frame; driving means mounted on said frame for imparting a driving force to said conveyor bed to swing said conveyor bed forward; and returning means for rapidly returning said conveyor bed backward to rest position whereby upon intermittent actuation of said driving means and said returning means objects positioned on said conveyor bed are thrown forward along said conveyor bed to convey the objects the length of the conveying apparatus.

4. Apparatus in accordance with claim 2 wherein said elongate conveyor bed is substantially horizontal, said means for swingably supporting said conveyor bed from said frame is operable to swing the conveyor bed from a plurality of horizontal axes while the sides of the conveyor move at swingably vertical planes, and wherein said support arms are spaced in pairs along the length of said conveyor bed, the arms of each pair being positioned on opposite sides of said conveyor bed, said other ends of each of said pairs of arms being rotatable about a common horizontal axis; driving means mounted on said frame for imparting driving force to said conveyor bed to swing said conveyor bed backward to rest position whereby, upon applying intermittent driving forces to said conveyor bed with said driving means and returning said conveyor bed to rest said objects are intermittently thrown forward down said conveyor bed to convey the objects the length of said conveyor apparatus.

5. A shearing structure adapted to receive large, heavy objects, convey the objects to a shear, and shear the objects into pieces comprising: a main frame; an elongate conveyor bed constructed and arranged to support said objects thereon between the sides thereof; means for swingably supporting said conveyor bed from said frame to swing said conveyor bed so that said sides of said conveyor bed move in substantially vertical planes including, a plurality of support arms, means for rotatably connecting one end of such support arms to said conveyor bed and means for rotatably supporting the other of said support arms from said frame; a substantially horizontal working platform positioned at the forward end of said conveyor bed when said conveyor bed is at rest, said working platform having a shear opening therein positioned transversely of the length of said conveyor bed and spaced from the end of said conveyor bed when said conveyor bed is at rest; stationary shear blades positioned along the upper edges of said shear opening running transversely of the sides of said conveyor bed; a shear bar positioned above the shear opening in said working platform; shear blades positioned along the edges of said shear bar in alignment with said stationary shear blades; driving means mounted on said frame for imparting a driving force to said conveyor to cause said conveyor to swing forwardly and rapidly return to a rest position; driving means mounted on said frame for driving said shear bar vertically downward to a position in which said movable shear blades are adjacent said stationary shear blades; a stop gate provided with a substantially vertical portion and a substantially horizontal portion and positioned on the opposite side of said shear opening from said conveyor bed; means for slidably moving said gate on said working platform from a position at which said vertical portion is spaced from said shear opening a distance substantially equal to said shear opening to a position in which said vertical portion is vertically aligned with the closest edge of said shear opening; a pusher having at least a substantially horizontal portion and a substantially vertical portion and positioned beneath said shear opening; and means for actuating said pusher to move said pusher from a position in which said vertical portion thereof is vertically aligned with the edge of the shear opening closest said conveyor bed to a position aligned with the opposite edge of shear opening for sweeping the area beneath said shear opening.

References Cited by the Examiner
UNITED STATES PATENTS

| 2,710,712 | 6/1955 | Friedman | 10—162 |
| 3,039,343 | 6/1962 | Richards | 83—105 |
| 3,058,361 | 10/1962 | Freeborn | 198—220 |

FOREIGN PATENTS

| 1,005,014 | 12/1951 | France. |
| 579,988 | 7/1958 | Italy. |

References Cited by the Applicant
UNITED STATES PATENTS

| 3,017,797 | 1/1962 | Hercik. |

WILLIAM W. DYER, Jr., *Primary Examiner.*

L. B. TAYLOR, *Assistant Examiner.*